J. HATCH.
Tree-Protector.
No. 64,667.
Patented May 14, 1867.
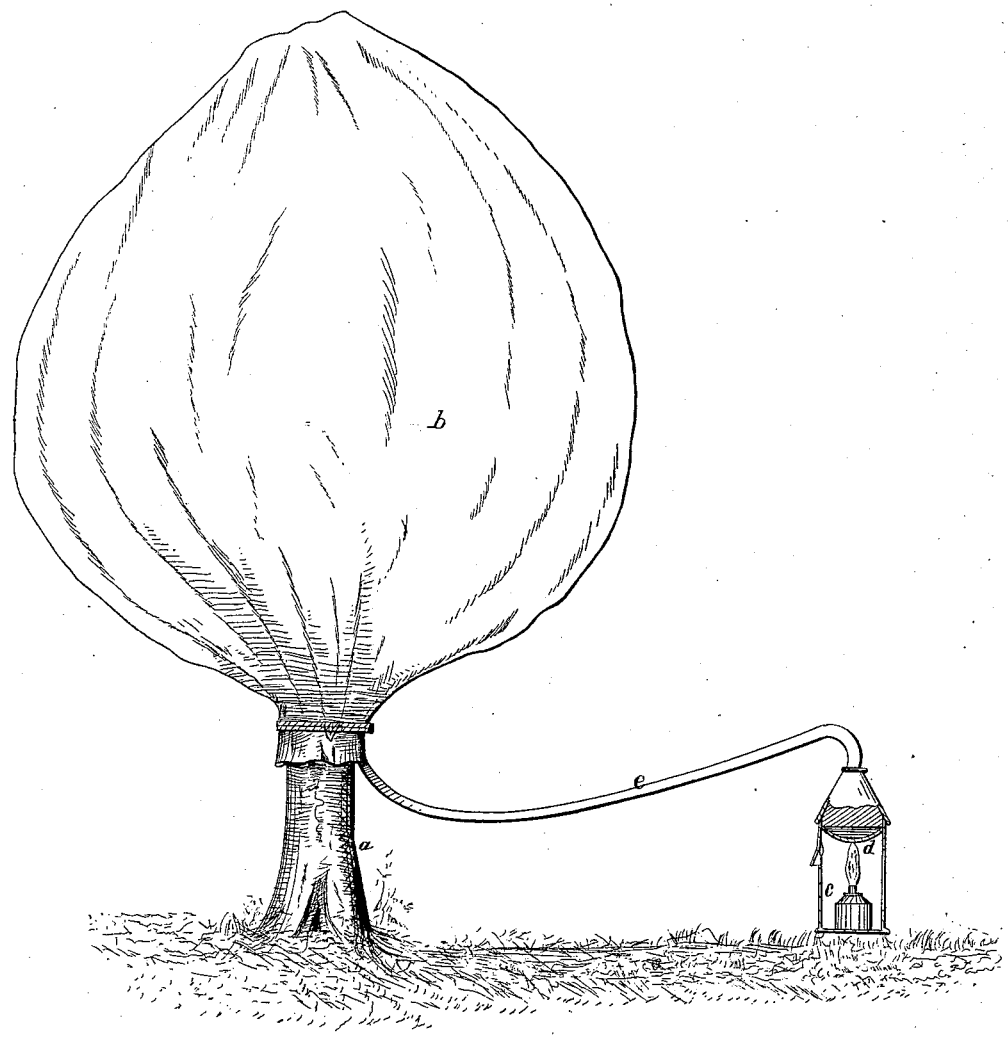

United States Patent Office

JAMES HATCH, OF LYNN, MASSACHUSETTS.

*Letters Patent No. 64,667, dated May 14, 1867; antedated May 1, 1867.*

IMPROVEMENT IN APPARATUS FOR DESTROYING INSECTS ON TREES.

The Schedule referred to in these Letters Patent and making part of the same.

TO ALL WHOM IT MAY CONCERN:

Be it known that I, JAMES HATCH, of Lynn, in the county of Essex, and State of Massachusetts, have invented an improved Apparatus for Destroying Insects upon Trees; and I do hereby declare that the following, taken in connection with the drawings which accompany and form part of this specification, is a description of my invention sufficient to enable those skilled in the art to practise it.

The invention relates particularly to the manner of effecting the destruction of insects known as canker worms, after their lodgment in trees, and while consuming the foliage thereof.

As is well known, these insects every year ruin the foliage of immense numbers of fruit and ornamental trees, and particularly of apple trees. To destroy these worms, which are hatched by female and wingless moths, which reach the branches by crawling up the trunk, various devices or protectors are used to prevent these moths from reaching the branches, such as tarring the trunks, surrounding them with troughs filled with oil or other fluid, or with strips of glass or mica; but none of these means are fully effectual, as tar or fluid is soon bridged over, and glass or other smooth surfaces become covered with dust, spiders' webs, or other substance or substances, over which the insects readily crawl, and in using such devices much time, care, and expense have to be incurred to keep the protectors in order.

In my invention I dispense with all these unreliable traps, and attack the worms themselves, after all the moths have ascended into the tree, and immediately after the worms are hatched, to effect their utter dislodgment. To do this, I cover the entire head of the tree with a thin cloth of close texture, drawing the edges around the trunk, so as to envelop the branches in a sort of sack. Near the tree I have a furnace, over which is placed a pan containing tobacco, pepper, or other substance, the smoke from which will stupefy or kill the worms; and from this pan I lead a pipe directly into the sack. Applying heat to the pan by a lamp, or by fuel introduced into the furnace, the smoke generated from the tobacco or other substance in the pan is thrown into the sack, and soon fills it, coming into contact with all the leaves, and either killing or instantly dislodging every worm, and all other insects which may be in the tree. It is the employment of this sack or cloth, in connection with the smoke-generating apparatus, and pipe leading therefrom into the sack, that constitutes my invention.

The drawing illustrates the invention.

*a* denotes the trunk of a tree, having a cloth, *b*, drawn over and around its head, and tied around the trunk. *c* is a furnace, at the top of which is a pan or receptacle, *d*, for containing the tobacco or other material from which the smoke is to be generated. From this pan a pipe, *e*, extends into the sack *b*, so that, while the tobacco is burning, its smoke is delivered into the sack, until the head of the tree becomes permeated therewith, causing the entire destruction of the worms, which drop from the leaves as soon as the smoke touches them. By having a sack properly made, and a portable fumigating furnace, an orchard may be soon entirely rid of these pests, and at a very small cost, compared to the cost incurred in using the devices designed to prevent the ascent of the moths, as a tree has to be smoked but once, and the same apparatus answers for all the trees.

I claim the fumigating furnace *c*, pan *d*, pipe *e*, and sack or cloth *b*, when used together, in combination, substantially as and for the purpose specified.

JAMES HATCH.

Witnesses:
F. GOULD,
M. W. FROTHINGHAM.